United States Patent [19] [11] 3,991,009
Margotte et al. [45] *Nov. 9, 1976

[54] MOULDING COMPOSITIONS OF GRAFT POLYCARBONATE AND GRAFT POLYMER RUBBERS

[75] Inventors: Dieter Margotte; Hugo Vernaleken, both of Krefeld-Bockum; Hermann Schnell, Krefeld Uerdingen, all of Germany

[73] Assignee: Bayer Aktiengesellschaft, Leverkusen, Germany

[ * ] Notice: The portion of the term of this patent subsequent to Dec. 24, 1991, has been disclaimed.

[22] Filed: Apr. 10, 1974

[21] Appl. No.: 459,604

[30] Foreign Application Priority Data
Nov. 16, 1973 Germany............................ 2357192

[52] U.S. Cl.............................. 260/42.18; 260/873
[51] Int. Cl.²..................... C08K 7/14; C08L 67/06
[58] Field of Search......................... 260/873, 42.18

[56] References Cited
UNITED STATES PATENTS
3,461,187  8/1969  Cantrill .............................. 260/873
3,687,895  8/1972  Vernaleken et al............ 260/47 XA
3,856,886  12/1974  Margotte et al. ................... 260/873

Primary Examiner—J. Ziegler
Attorney, Agent, or Firm—Frederick H. Colen; Lawrence S. Pope; Gene Harsh

[57] ABSTRACT

Thermoplastic moulding compositions of 1. 70 – 20 % by weight of graft polycarbonates whose graft stock is a vinyl polymer with a molecular weight of from 10,000 to 100,000, containing from 3 to 10 side chains attached by carbon, each of which contains a hydroxyphenyl group, on which aromatic polycarbonate chains are condensed, and 2. 30 – 80 % by weight of graft polymer rubbers obtained by polymerizing a mixture of 2.1. 50 – 90 % by weight styrene, α-methylstyrene, methylmethacrylate or mixtures thereof, and 2.2. 10 – 50 % by weight acrylonitrile, methacrylonitrile, methylmethacrylate or mixtures thereof on a diene or acrylate rubber.

26 Claims, No Drawings

MOULDING COMPOSITIONS OF GRAFT POLYCARBONATE AND GRAFT POLYMER RUBBERS

This invention relates to thermoplastic moulding compositions comprising:
1. 70 – 20%, by weight, of graft polycarbonates in which the graft stock is a vinyl polymer with a molecular weight of from 10,000 to 100,000 which contains from 3 to 10 side chains attached by carbon, each side chain containing a hydroxyphenyl group, on which aromatic polycarbonate chains are condensed, and
2. 30 – 80%, by weight, of graft polymer rubbers obtained by polymerising a mixture of:
2.1. 50 – 90%, by weight, of styrene, α-methylstyrene, methyl methacrylate or mixtures thereof, and
2.2. 10 – 50%, by weight, of acrylonitrile, methacrylonitrile, methylmethacrylate or mixtures thereof on a diene or acrylate rubber.

Graft polycarbonates (1):

These products are already known in principle from German Offenlegungsschriften 1,950,982 and U.S. Pat. No. 3,687,895. To obtain these products, the graft stock is first produced. This is a copolymer preferably produced by the conventional method of radical initiated polymerisation from one or more ethylenically unsaturated compounds (in principle any compounds of this type) and one aromatic hydroxy compound which is copolymerisable by an olefinically unsaturated substituent.

The preferred ethylenically unsaturated compounds are aromatic vinyl compounds, e.g. styrene, α-methylstyrene, vinyl naphthalene; acrylic and methacrylic acid derivatives, e.g. their nitriles, (acrylonitrile, methacrylonitrile), and $C_1 - C_6$ alkyl esters (methyl acrylate, methyl methacrylate, ethyl acrylate, ethyl methacrylate, butyl acrylate, hexyl acrylate, butyl methacrylate), and vinyl esters of aliphatic carboxylic acids (vinyl acetate, vinyl propionate).

Two of these monomers may be used together, e.g. styrene and acrylonitrile (preferably in weight ratios of from 90:10 to 50:50) or one monomer may be used alone, e.g. methylmethacrylate.

The preferred polymerisable aromatic hydroxy compounds are those which correspond to the following formula:

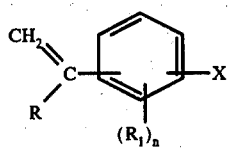

wherein
R = H, $C_1$–$C_4$ alkyl;
$R_1$ = H, Cl, Br, $C_1$–$C_4$ alkyl, cycloalkyl, $C_1$–$C_4$ alkoxy;
n = 0, 1, 2;

X = —OH

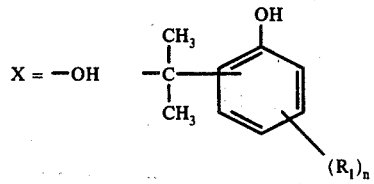

Examples of suitable polymerisable aromatic hydroxy compounds include, e.g. p-isopropenylphenol and 2-(hydroxyphenyl)-2-(p-isopropenylphenyl)-propane.

In general, from 1 to 10, preferably from 2 to 5, mols of polymerisable aromatic hydroxyl compound are used per 100 mols of total monomers in the copolymerisation to obtain the graft stock. The copolymers obtained generally have a molecular weight (determined by osmosis), of from 10,000 to 40,000 and contain from 3 to 10 hydroxyl groups per molecule.

The graft stock is then reacted with aromatic dihydroxy compounds or mixtures thereof, preferably di-(hydroxyphenyl)alkanes, 2,2-di-(p-hydroxyphenyl)-propane (bisphenol A), tetrachlorobisphenol A or tetrabromobisphenol A, (halogenated bisphenol A yielding flame resistant products), and phosgene or other carbonic acid derivatives under conditions of polycarbonate formation. It is essential in this reaction that the reaction mixture should contain at least 1 mol of hydroxy compound and at least 1 mol of phosgene (or other carbonic acid derivative), per mol of OH groups in the graft stock so that all the OH groups in the stock will be grafted with polycarbonate. The reaction follows the known method of preparing polycarbonates and has already been described in principle in German Offenlegungsschriften 1,770,144 and 1,950,982.

Graft polymer rubbers (2):

These graft copolymers are also known (see British Pat. No. 794,400).

They are obtained, for example, by radical emulsion polymerisation of graft monomers (2.1) and (2.2) in the presence of a rubber latex. The following rubbers are particularly suitable for the purpose of this invention: polybutadiene, butadiene/styrene copolymers, butadiene/acrylate copolymers, and polyacrylates. The term "acrylate", as used herein denotes $C_1 - C_6$ alkyl esters of acrylic and methacrylic acid, e.g. ethyl acrylate, methyl methacrylate or butyl acrylate. The rubbers, particularly if they are copolymers, may also contain small quantities (up to approximately 10% by weight) of other monomers. These additional monomers used may inter alia be methacrylamide, methacrylamidomethylol ether, acrylic acid, divinylbenzene or ethylene glycol dimethacrylate, depending on the nature of the rubber. As a general rule, from 10 to 200 parts by weight of monomer are grafted on 100 parts by weight of rubber. Grafting is generally not complete so that only part of the monomers are graft polymerised on the rubber and a separate copolymer of these monomers is obtained as a second product. This is generally a resin-like material. If desired, only a part of the total monomers may be polymerised in the presence of the rubber and the remainder may be added as a separately polymerised resin. It is essential that the resulting mixture has a rubber content of from 5 to 40% by weight and that sufficient monomers are actually graft polymerised on the rubber to render the grafted rubber compatible with the resin.

Moulding compositions of the following components are particularly preferred:

10 – 100% by weight of a graft polymer of
  10 – 90 parts by weight of a monomer mixture of
    50 – 90% by weight styrene and
    50 – 10% by weight acrylonitrile, on 90 – 10 parts by weight of polybutadiene, a copolymer of butadiene and acrylonitrile, (optionally containing small quantities of methacrylic acid and/or divinylbenzene), or polybutylacrylate, (optionally containing small quantities of methacrylamidomethylol ether) and 0 – 90% by weight of a resin-like copolymer of 50 – 90% by weight styrene and 50 – 10% by weight acrylonitrile.

The term "graft polymer rubber", as used herein, denotes not only the graft polymer proper but also mixtures of the graft polymer proper with copolymers which have either been prepared separately from the graft monomers or have been formed from them during the grafting reaction.

The moulding compositions according to the invention contain from 70 to 20% by weight of graft polycarbonate and from 30 to 80% by weight of graft polymer rubber. They may be obtained by the conventional method of mixing the two components, using mixing apparatus such as rubber mills, internal kneaders or double shaft extruders. The moulding compositions may also contain fillers, glass fibres, pigments and the conventional additives, e.g. stabilisers, flame-retarding agents, fluidizing agents or lubricants. They may be processed particularly easily by injection moulding for example, they are suitable for manufacturing moulded products such as parts of housings. They differ from similar mixtures which do not contain grafted polycarbonates by the exceptional ease with which they may be processed and, in particular, by their improved resistance to alkalies and to hot water.

The products are also improved in their dynamic characteristics.

EXAMPLES a. Graft polycarbonates, having a relative viscosity of 1.304, prepared by grafting 90 parts, by weight, of an aromatic polycarbonate based on bisphenol A on 10 parts, by weight, of a copolymer consisting of 78 parts, by weight, styrene, 17 parts, by weight, acrylonitrile and 5 parts, by weight, isopropenylphenol;

b. graft polycarbonate, having a relative viscosity ($\eta_{rel}$) = 1.28 prepared by grafting 80 parts, by weight, of an aromatic polycarbonate based on bisphenol A on 20 parts, by weight, of a copolymer consisting of 95 parts, by weight, methyl methacrylate and 5 parts, by weight, isopropenylphenol;

c. mixture of 1. 30 parts, by weight, of a graft polymer prepared by grafting 35 parts, by weight styrene and 15 parts, by weight, acrylonitrile on 50 parts, by weight, of a coarse textured polybutadiene, (according to the particulars given in German Auslegeschriften Nos. 1,247,665 and 1,269,360), in which the average particle diameter of the polybutadiene graft stock which is in the latex form is from 0.3 to 0.4$\mu$, and 2. 70 parts, by weight, of a copolymer of 70 parts, by weight, styrene and 30 parts, by weight acrylonitrile, which copolymer has an intrinsic viscosity of [$\eta$] = 79.8, (determined in dimethylformamide at 20° C);

d. mixture of 1. 18.75 parts, by weight, of graft polymer prepared by grafting 16 parts, by weight, styrene and 4 parts, by weight, acrylonitrile on 80 parts, by weight, of a finely divided polybutadiene in the latex form with an average particle diameter of from 0.05 to 0.1$\mu$, and 2. 81.25 parts, by weight, of a styrene/acrylonitrile copolymer, having a styrene/acrylonitrile ratio of 72:28 and an intrinsic viscosity of [$\eta$] = 79.4 (determined in dimethylformamide at 20° C);

e. mixture of 71 parts, by weight, of a copolymer of 80 parts, by weight, styrene and 20 parts, by weight, acrylonitrile, and 29 parts, by weight, of a copolymer of 60 parts, by weight, butadiene, 36 parts, by weight, acrylonitrile, 3 parts, by weight, methacrylic acid and 1 part, by weight, divinylbenzene;

f. mixture of 1. 40 parts, by weight, of a graft polymer prepared in emulsion by grafting 35 parts, by weight, styrene and 15 parts, by weight, acrylonitrile on 50 parts, by weight, of a copolymer of 96 parts, by weight, butyl acrylate and 4 parts, by weight, methacrylamide-N-methlolmethylether, and 2. 60 parts, by weight, of a copolymer of 70 parts, by weight, styrene and 30 parts, by weight, acrylonitrile, which copolymer has an intrinsic viscosity of [$\eta$] = 80.1, (determined in dimethylformamide at 20° C);

g. mixture of 1. 30 parts, by weight, of a graft polymer prepared in emulsion by grafting 40 parts, by weight, styrene and 20 parts, by weight, acrylonitrile on 40 parts, by weight, of a copolymer of 80 parts, by weight, butyl acrylate and 20 parts, by weight, of butadiene, and 2. 70 parts, by weight, of a styrene/acrylonitrile copolymer which has a styrene/acrylonitrile ratio of 70:30 and an intrinsic viscosity of [$\eta$] = 79.0, (determined in dimethylformamide at 20° C). Components (a) and (b) are homogenised with components (c) to (f) in a double shaft extruder at temperatures of from 240° to 270° C.

The composition and some of the mechanical properties are summarised in Table 1.

Table 1

| Example | | Ex.1 | Ex.2 | Ex.3 | Ex.4 | Ex.5 | Ex.6 | Ex.7 |
|---|---|---|---|---|---|---|---|---|
| Graft polycarbonate a) | Parts, by weight | 100 | — | 40 | 50 | — | — | — |
| Graft polycarbonate b) | Parts, by weight | — | 100 | — | — | 40 | 40 | 60 |
| Mixture c) | Parts, by weight | — | — | 60 | — | — | — | — |
| Mixture d) | Parts, by weight | — | — | — | — | 60 | — | — |
| Mixture e) | Parts, by weight | — | — | — | — | — | — | 40 |
| Mixture f) | Parts, by weight | — | — | — | 50 | — | — | — |
| Mixture g) | Parts, by weight | — | — | — | — | — | 60 | — |
| Elongation on tearing DIN 53 455 | % | 40 | 30 | 60 | 70 | 70 | 65 | 50 |
| E-modulus DIN 53 455 | kp/cm$^2$ | 25,000 | 26,000 | 20,000 | 19,000 | 20,100 | 23,700 | 23,000 |
| Impact strength DIN 53 453 | cmkp/cm$^2$ | 80 | 75 | n.b. | n.b. | n.b. | n.b. | n.b. |
| Notched impact strength DIN 53453 | cmkp/cm$^2$ | 11 | 4 | 23 | 25 | 22 | 31 | 19 |
| Vicat number Method A DIN 53 460 | ° C | 148 | 143 | 138 | 136 | 138 | 142 | 140 | n.b. = not broken

We claim:
1. A composition comprising:
   1. from 70 to 20% by weight of at least one graft polycarbonate whose graft stock is a vinyl polymer with a molecular weight of from 10,000 to 100,000 containing from 3 to 10 side chains attached via carbon atoms, each of which contains at least one hydroxyphenyl group, on which aromatic polycarbonate chains are condensed, and
   2. from 30 to 80% by weight of at least one graft polymer obtained by graft polymerizing a mixture comprising:
      a. from 50 to 90% by weight styrene, α-methylstyrene, methylmethacrylate or mixtures thereof, and
      b. from 10 to 50% by weight acrylonitrile, methacrylonitrile, methylmethacrylate or mixtures thereof on a diene or acrylate rubber.

2. A composition as claimed in claim 1 in which the said graft polycarbonates comprise a graft stock prepared by the radical initiated copolymerization of at least one ethylenically unsaturated compound and at least one aromatic hydroxy compound which has a

substituent wherein R is hydrogen or alkyl having 1 to 4 carbon atoms.

3. A composition as claimed in claim 2 in which the ethylenically unsaturated compound is selected from the group consisting of styrene, α-methylstyrene, vinyl naphthalene, acrylonitrile, methacrylonitrile, methylacrylate, methylmethacrylate, ethylacrylate, ethylmethacrylate, butylacrylate, hexylacrylate, butylmethacrylate, vinyl acetate and vinyl propionate.

4. A composition as claimed in claim 3 in which a mixture of two of the said ethylenically unsaturated compounds is used.

5. A composition as claimed in claim 4 in which said mixture contains styrene and acrylonitrile in weight ratios of from 90:10 to 50:50.

6. A composition as claimed in claim 2 in which the said polymerizable aromatic hydroxy compound corresponds to the formula:

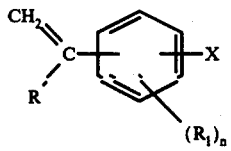

wherein
R is as aforesaid;
R₁ is H, Cl, Br, C₁–C₄ alkyl, cycloalkyl or C₁–C₄ alkoxy;
n represents 0, 1 or 2 and
X is —OH or

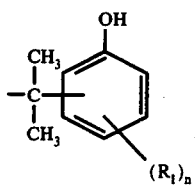

7. A composition as claimed in claim 6 in which the said aromatic hydroxy compound is p-isopropylphenol or 2-(hydroxyphenyl)-2-(p-isopropylphenyl)-propane.

8. A composition as claimed in claim 2 in which from 1 to 10 mols of the polymerizable aromatic hydroxyl compound is used for every 100 mols of the total quantity of monomers involved in the copolymerization process.

9. A composition as claimed in claim 2 in which the said graft stock copolymer has a molecular weight of from 10,000 to 100,000.

10. A composition as claimed in claim 9 in which the said molecular weight is from 10,000 to 40,000.

11. A composition as claimed in claim 2 in which the said graft stock copolymer contains from 3 to 10 hydroxyl groups per macromolecule.

12. A composition as claimed in claim 2 in which the said graft stock is reacted with at least one di-(hydroxyphenyl)alkane and phosgene under conditions of polycarbonate formation.

13. A composition as claimed in claim 12 in which the said di-(hydroxyphenyl)-alkane is selected from bisphenol A, tetrachlorobisphenol A and tetrabromobisphenol A.

14. A composition as claimed in claim 12 in which the reaction mixture for the said reaction comprises at least 1 mol of the said hydroxy compound and at least 1 mol of phosgene or other carbamic acid derivative per mol of OH groups in the said graft stock.

15. A composition as claimed in claim 1 in which the said graft polymer component is prepared by the radical emulsion polymerization of graft monomers (a) and (b) in the presence of a rubber latex.

16. A composition as claimed in claim 15 in which the said rubber comprises polybutadiene, butadiene/styrene copolymers, butadiene/acrylate copolymers and polyacrylates.

17. A composition as claimed in claim 16 in which the said rubber also comprises up to approximately 10% by weight of at least one other monomer selected from the group consisting of methylacrylamide, methacrylamidomethylol ether, acrylic acid, divinylbenzene and ethylene glycol dimethacrylate.

18. A composition as claimed in claim 15 in which a total of from 10 to 200 parts by weight of monomer is grafted onto 100 parts by weight of the said rubber.

19. A composition as claimed in claim 15 in which the graft polymer component comprises from 5 to 40% by weight of said rubber.

20. A composition as claimed in claim 15 in which the said graft polymer comprises:
   from 10 to 100% by weight of a graft polymer of 10 to 90 parts by weight of a monomer mixture of:
      from 50 to 90% by weight styrene and
      from 50 to 10% by weight acrylonitrile on
   from 90 to 10 parts by weight of polybutadiene, butadiene/acrylonitrile copolymer or polybutylacrylate and
   from 0 to 90% by weight of a resin-like copolymer of
      from 50 to 90% by weight styrene and
      from 50 to 10% by weight acrylonitrile.

21. A composition as claimed in claim 20 in which the said butadiene/acrylonitrile copolymer also comprises small quantities of methacrylic acid, divinylbenzene or a mixture thereof.

22. A composition as claimed in claim 20 in which the said polybutylacrylate also comprises small quantities of methacrylamidomethylol ether.

23. A composition as claimed in claim 1 which also comprises fillers, glass fibres, pigments, stabilizers, flame-retarding agents, fluidizing agents, lubricants or mixtures thereof.

24. Moulded products derived from a composition as claimed in claim 1.

25. Moulded products as claimed in claim 24 when formed by an injection moulding process.

26. A composition comprising from 70 to 20% by weight of a graft polycarbonate, whose graft stock is a copolymer of 95 parts by weight of methylmethacrylate and 5 parts by weight of isopropenyl phenol onto which aromatic polycarbonate chains made from phosgene and bisphenol A are condensed and from 30 to 80% by weight of a graft polymer obtained by graft polymerizing a mixture of 50 to 90% by weight styrene and 10 to 50% by weight acrylonitrile onto polybutadiene.

\* \* \* \* \*